Nov. 24, 1959 L. F. PETERSON 2,913,753
DEVICE FOR APPLYING ROOFING CEMENT
Filed Feb. 15, 1957 2 Sheets-Sheet 2
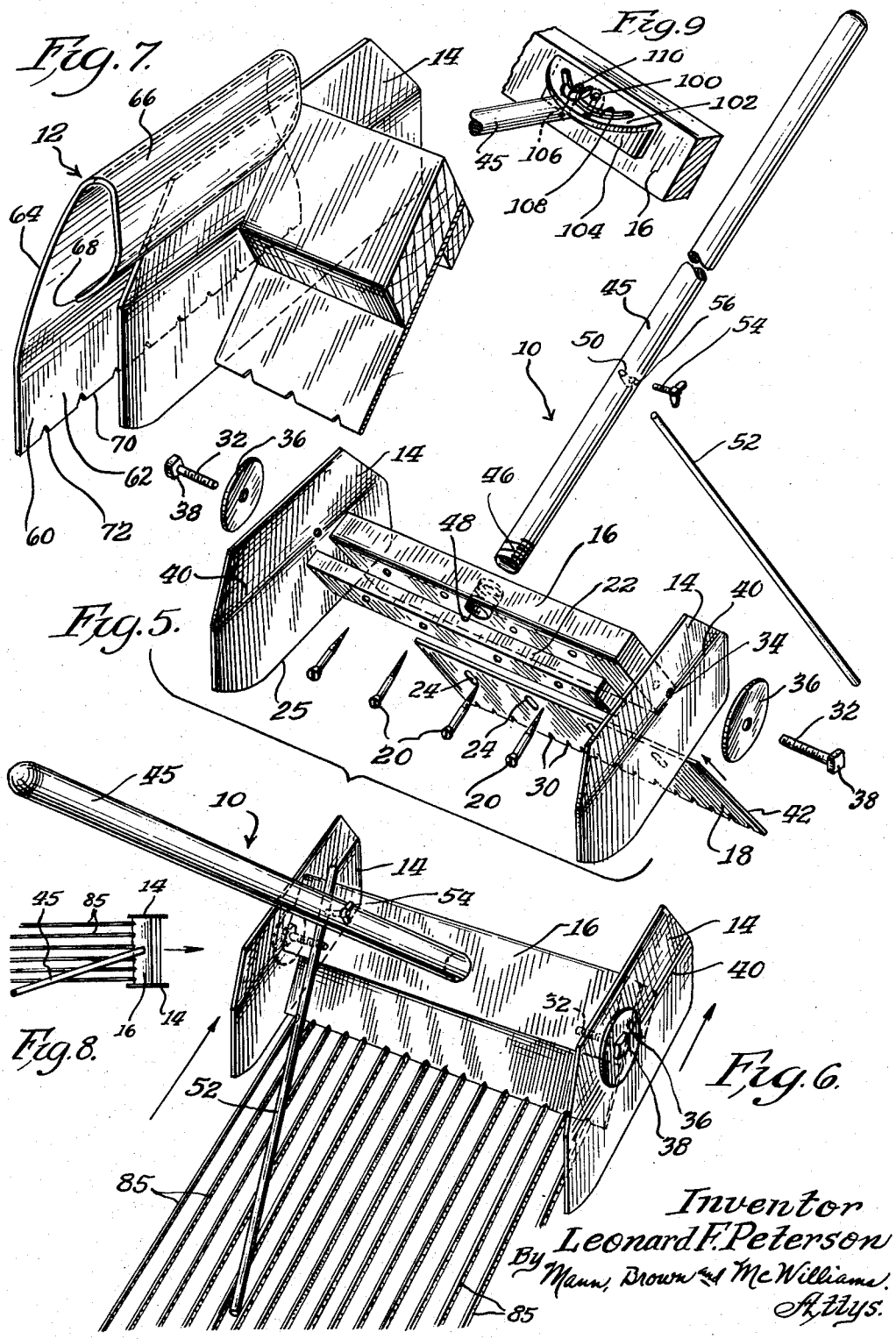
Inventor
Leonard F. Peterson
By Mann, Brown & McWilliams
Attys.

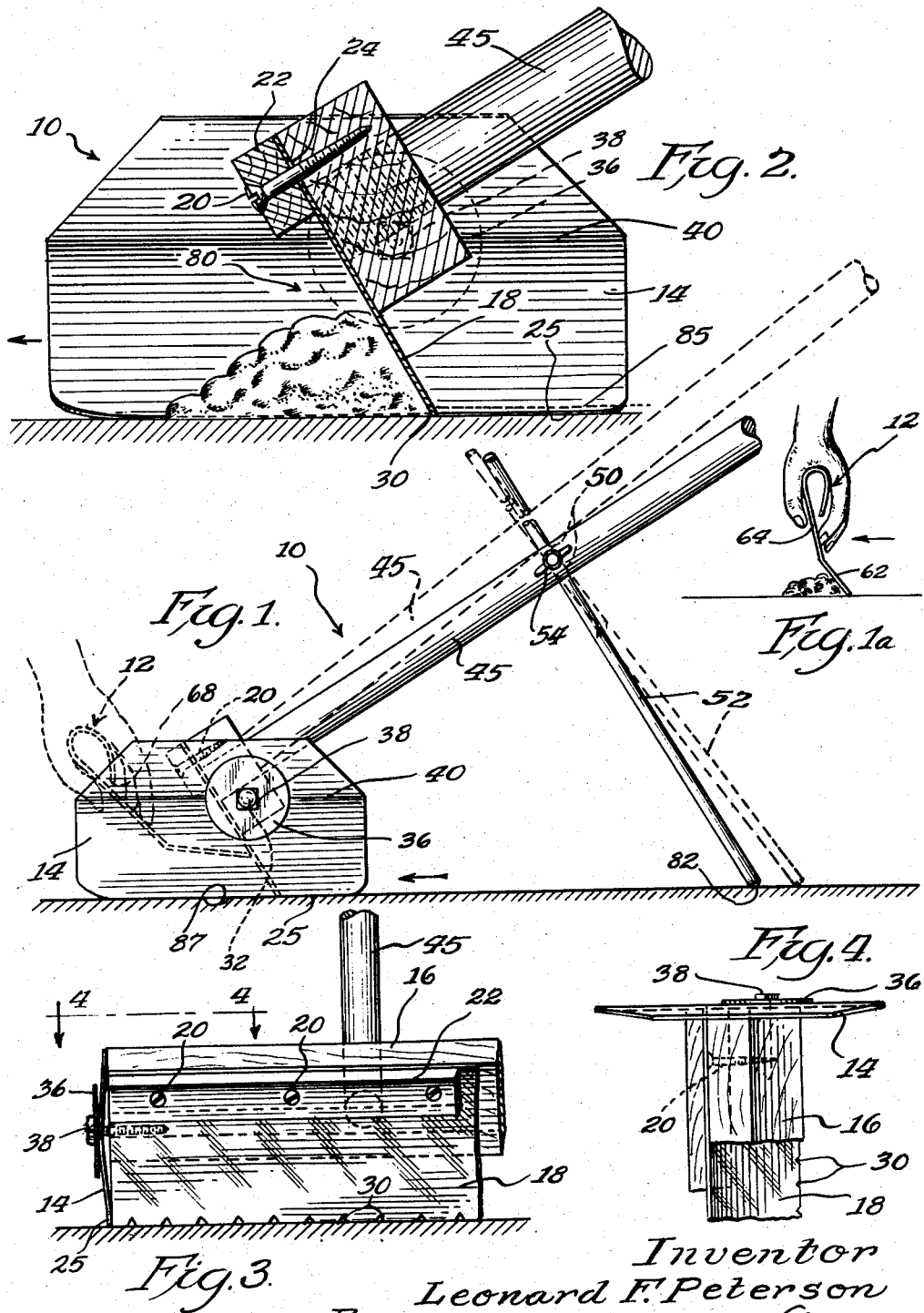

United States Patent Office 2,913,753
Patented Nov. 24, 1959

2,913,753

DEVICE FOR APPLYING ROOFING CEMENT

Leonard F. Peterson, Sister Bay, Wis.

Application February 15, 1957, Serial No. 640,532

2 Claims. (Cl. 15—236)

My invention relates to a device for applying roofing cement, and more particularly, to a device for use in connection with cementing rolled roofing in place.

Roofing cement is conventionally spread piecemeal where needed to secure roofing in place. This is a time consuming process which frequently results in an unequal application of the cement with consequent poor adhesion at the spots where the cement was skimpily applied.

Furthermore, conventional tools for handling roofing cement are not designed to protect the worker's person or his clothes from contact with the highly sticky substances comprising the cement.

A principal object of my invention is to provide a roofing cement spreading device which permits one to evenly spread a pile of cement over a substantial distance at walking speed.

A further principal object of my invention is to provide a roofing cement spreader which insures that the person and clothes of the worker will not come into contact with the cement.

Still a further object of the invention is to provide a roofing cement spreader that is economical of manufacture, convenient in use, and readily adapted for use in a variety of roofing cement applications, as well as for use in connection with the spreading and handling of other similar substances.

Other objects, uses, and advantages will be obvious or become apparent upon a consideration of the following detailed description and the accompanying application drawings.

In the drawings:

Figure 1 is a side elevational view of a roofing cement spreader in accordance with my invention, showing several adjusted positions of the handle thereof and showing in dotted lines an auxiliary spreader useful in spreading roofing cement, and as illustrated, showing how the auxiliary spreader is used to clean off my cement spreader;

Figure 1a is a side elevational view showing how my auxiliary cement spreader is applied to roofing cement;

Figure 2 is a cross-sectional view through the cement spreader shown in full lines in Figure 1;

Figure 3 is an elevational view taken from the left of Figure 1, parts being broken away;

Figure 4 is a plan view along line 4—4 of Figure 3;

Figure 5 is an exploded perspective view of the device shown in full lines in Figure 1;

Figure 6 is a perspective view illustrating the manner in which the device of Figure 5 is applied to a pile of roofing cement;

Figure 7 is a fragmental perspective view showing how my auxiliary spreader may be conveniently applied to the device of Figures 5 and 6;

Figure 8 is a diagrammatic plan view illustrating the manner in which the handle of the device shown in Figures 5 and 6 may be applied thereto; and Figure 9 is a fragmental perspective view illustrating a modified form of the device shown in Figures 5 and 6.

Reference numeral 10 of Figures 1, 2, 5, and 6 generally indicates a roofing cement spreader arranged in accordance with the principles of my invention while reference numeral 12 of Figures 1, 1a, and 7 generally indicates an auxiliary cement spreader that is useful in operating the device 10.

As best shown in Figure 5, the device 10 comprises a pair of spaced runners 14 pivotally secured to the ends of a head or cross member 16. Cross member 16 carries a blade or plate 18 secured thereto in any suitable manner as by screws 20 passing through fastening strip 22 into the member 16. Screws 20 pass through elongate holes 24 formed in the blade or plate 18, the holes permitting vertical adjustment of the plate or blade.

As indicated in the several figures, the blade or plate 18 partitions off the space between the runners 14 and is greater in width than the distance between the pivotal mountings of the runners 14 and their bottom edges 25. The plate or blade is substantially imperforate, aside from holes 24 which are covered up when the blade or plate is applied to the device, and in normal operating position is inclined upwardly in a forward direction (that is, in the direction of the arrows of Figures 1, 2, and 6). The lower edge of the blade is formed with a plurality of spaced V-shaped notches 30 for purposes hereinafter made clear; the particular shape of the notches is not critical, however.

The runners 14 are pivotally secured to the cross member 16 by lag screws 32 passing through holes 34 formed in the runners into appropriate screw threaded holes formed in the member 16. A relatively wide washer 36 is interposed between the head 38 of each screw and the outer surface of the respective runners 14. The runners 14 are preferably each provided with a preset bend substantially along line 40 so that when the lag screws are turned firmly into place, the lower edges 25 of the runners will bear snugly against the sides 42 of the blade or plate 18 (see Figure 3).

In the illustrated embodiment, the handle for the device 10 takes the form of an elongate rod or pole 45 screw threaded as at 46 for turning into screw threaded hole 48 formed in the member 16. The member 45 is perforated as at 50 to slidably receive an elongate dowel member 52 which may be clamped in a desired position by clamp screw 54 that is screw threadedly received in screw threaded hole 56 formed in the member 45 so that it will bear against the member 52.

The device 12 comprises a sheet 60 of relatively stiff material formed with a first relatively flat portion 62 that merges at an angle of about 30 degrees into a second relatively flat portion 64 which terminates in a curled end 66. The termination 68 of end 66 is preferably spaced slightly from the portion 64, as indicated in Figure 1.

The elongate edge 70 of portion 62 is formed with a plurality of spaced V-shaped notches 72 which are similar in shape to notches 30 of plate or blade 18.

In use, approximately ½ to ¾ of a gallon of roofing cement is poured on the roof at the start of a strip or path which one desires to cover with roofing cement. The device 10 is then pushed by the operator into the cement, for instance, in the direction of the arrows in Figures 2 and 6, which forces the cement into the pocket 80 that is formed by the runners 12 and the blade or plate 18 together with the roof. As indicated in Figure 2, this pocket 80 is triangular in cross-sectional configuration, and the notches 30 are disposed along the apex of this triangular configuration.

As pressure against the cement continues, it compacts in front of the notches 20, and is scraped across the surface to which it is being applied. The notches 30 form ridges 85 of roofing cement as the device 10 is pushed along over its desired path of movement. The result is that the roofing cement saturates the roofing to which the cement is being applied and in addition forms the upstanding ridges 85. The worker may move at a rapid walking speed to the end of the strip that is to be covered or until the pile of roofing cement is exhausted. Preferably, the operator stops forward movement before the roofing cement is exhausted and finishes the spreading of the cement with auxiliary spreader 12 in the manner indicated in Figure 1a. The operator grasps the device 12 substantially as shown and urges same in the direction of the arrow of Figure 1a to leave a path of roofing cement that is substantially similar to the path left by the device 10.

The length of the dowel 52 extending below the point it emerges from member 45 may be adjusted to provide the desired angle of inclination of the blade 20 with respect to the surface that the roofing cement is being applied to. Of course, the pressure applied to the blade 18 by the handle 45 and consequently the pressure applied to the cement within pocket 80 is varied by varying the angle of the member 45 with respect to the surface on which the cement is being spread, and once the desired pressure and depth of spreading roofing cement is obtained, the screw 54 may be set and the lower end 82 of the dowel contacting the surface being covered (between two ridges 85) maintains approximately an even pressure on the cement and provides an even spreading of the cement.

The relatively long runners 14, being pivotally mounted, insure that the blade 18 will remain properly aligned with the roof even though the roof includes bumps and depressions, such as the depression 87 of Figure 1.

When it is desired to clean off the blade 18 and the runners 14, the device 12 may be employed in the manner indicated in dotted lines in Figure 1. It will be noted that the user's fingers or hand does not come into contact with the roofing cement. The device 12 can also be used before the device 10 is applied to a pile of cement to initially spread some of the cement rearwardly of the pile.

When the device 12 is not being used, it may be conveniently mounted on one of the runners 14 in the manner indicated in Figure 7.

The handle member 45 may extend perpendicularly from the member 16 as indicated in Figure 3 or may extend at an angle thereto as indicated in Figure 8 so that the user may conveniently operate the device 10 from one side of a row of ridges 85. In the device diagrammatically shown in Figure 8, the operator would be walking on the right hand side of the device with respect to the direction of the arrow.

In the alternate embodiment of Figure 9, the member 45 is pivotally secured as at 100 to the arcuate flange 102 of angle bracket 104. A screw 106 carried by member 45 extends upwardly through arcuate slot 108 of flange 102 and thumb screw 110 screw threadedly received on element 106 may be employed to secure member 45 in the desired angular position with respect to cross member 16 of Figure 9.

In the illustrated embodiment, the runners 14 and auxiliary spreader 12 may be formed from 16 and 22 gauge sheet steel respectively and the blade 18 is preferably formed from trowel grade sheet steel. The members 16, 22, and 45 may be formed from wood, as may dowel element 52. However, these elements also may be formed from appropriate other metallic or plastic substances, and member 45 may comprise a plurality of interconnecting sections so that it may be reduced to minimum length for packing and storage in a small container.

I have found that the device 10 will spread a strip of roofing cement the width of the spreader as fast as the operator can walk. My invention has been job proven to be a very efficient tool that does a neat job of spreading roofing cement in the application of selvedged edge roofing and other types of rolled roofing in a minimum amount of time. I have found that it saves as much as ½ the time formerly used up by spreading roofing cement in accordance with prior practices. The ridges 85 will make contact with the roofing even if it is not pressed flat, forming spaced moisture seals that preclude roof leakage.

The foregoing description and the drawings are given merely to explain and illustrate my invention and the manner in which it may be performed, and the invention is not to be limited thereto, except in so far as the appended claims are so limited since those skilled in the art who have my disclosure before them will be able to make modifications and variations therein without departing from the scope of the invention.

I claim:
1. A roofing cement spreader for spreading a pile of roofing cement over a substantially straight path along a roof, said spreader comprising a cross member, a runner pivotally secured to each end of the cross member and extending substantially normally thereof, a spreader blade secured to said cross member, said blade extending between said runners and being greater in width than the distance between the pivotal axes of said runners and the bottoms thereof, said runners each comprising an elongate plate-like element extending forwardly and rearwardly of said blade, means for drawing said runners against the side edges of said blade, said blade being inclined upwardly in a forward direction and defining with the roof and said runners a forwardly directed pocket for receiving and trapping the pile of cement when the spreader is pushed forwardly against same, said blade being formed with spaced notches along its lower edge, said blade edge forming the rearwardmost position of said pocket, and a rearwardly and upwardly inclined handle secured to said cross member for forcing the spreader in a forward direction against the pile of cement to trap same in said pocket, whereby the cement is spread along the path by passing outwardly of the notches as movement of the spreader continues along said straight path.

2. The spreader set forth in claim 1 including an elongate dowel carried by said handle for contacting the roof, said dowel being disposed in a plane that includes said handle and extends longitudinally of said handle and normally of said spreader blade, whereby the angle of said blade with respect to said roof may be held constant over said path, and means for adjusting the length of said dowel extending between said handle and the roof to vary the angle of said blade with respect to the roof.

References Cited in the file of this patent

UNITED STATES PATENTS

| | | |
|---|---|---|
| 1,144,891 | Cannon | June 29, 1915 |
| 1,389,249 | Kitchel | Aug. 30, 1921 |
| 1,399,381 | Evans | Dec. 6, 1921 |
| 1,697,756 | Curran | Jan. 1, 1929 |
| 2,008,952 | Gach | July 23, 1935 |
| 2,081,735 | Caronia | May 25, 1937 |
| 2,287,231 | Cathcard | June 23, 1942 |
| 2,338,558 | Wickwire | Jan. 4, 1944 |
| 2,385,653 | Rockola | Sept. 25, 1945 |
| 2,425,215 | West | Aug. 5, 1947 |
| 2,806,240 | Cottar | Sept. 17, 1957 |
| 2,824,300 | Williams | Feb. 25, 1958 |